United States Patent [19]
Takano et al.

[11] Patent Number: 5,029,450
[45] Date of Patent: Jul. 9, 1991

[54] REFRIGERATOR COMMODITIES TRANSPORT SYSTEM

[75] Inventors: Yoshiaki Takano, Sumiyoshi; Koichi Sato, Yoshida, both of Japan

[73] Assignee: Sanyo Electric Co., Ltd., Osaka, Japan

[21] Appl. No.: 566,515

[22] Filed: Aug. 10, 1990

[30] Foreign Application Priority Data

Aug. 11, 1989 [JP] Japan .................................. 1-208061

[51] Int. Cl.$^5$ ............................................. F25D 17/08
[52] U.S. Cl. ........................................ 62/239; 62/434; 165/10 A
[58] Field of Search .................... 62/239, 237, 434; 165/10 A

[56] References Cited

U.S. PATENT DOCUMENTS

| | | | |
|---|---|---|---|
| 4,258,696 | 3/1981 | Gopal | 165/10 A X |
| 4,259,401 | 3/1981 | Charoudi et al. | 165/10 A X |
| 4,402,188 | 9/1983 | Skala | 165/10 A X |
| 4,637,222 | 1/1987 | Fujiwara et al. | 62/244 X |
| 4,712,387 | 12/1987 | James et al. | 62/434 |
| 4,831,837 | 5/1989 | Negishi et al. | 62/239 |
| 4,969,509 | 11/1990 | Merensky | 62/239 X |

FOREIGN PATENT DOCUMENTS

63169464 7/1988 Japan .

*Primary Examiner*—William E. Tapolcai
*Attorney, Agent, or Firm*—Darby & Darby

[57] ABSTRACT

A refrigerated commodities transport system comprising: freight-collecting device for collecting from a client commodities to be refrigerated or already refrigerated commodities; storing device for storing the collected commodities in a low temperature area so as to keep them refrigerated; the storing device including a refrigerating box; transport device for transporting the commodities while being stored in the low temperature area; delivering device for delivering the commodities which are kept refrigerated to a recipient; in which the refrigerating box comprises a cooling device which has a freezing room, a cold-heat accumulating agent stored in the freezing room, air blowers and an evaporator; a storing room; an air-blowing device; a selecting section and a temperature control device, which permits transportation, in only one refrigerating box, of refrigerated commodities or commodities to be refrigerated in different temperature zones.

6 Claims, 5 Drawing Sheets

REFRIGERATOR COMMODITIES TRANSPORT SYSTEM

BACKGROUND OF THE INVENTION

1. Field of the Invention

The present invention relates to a refrigerated commodities transport system in which commodities from a client are loaded onto a truck at a freight-collecting place and then transported to a recipient while being kept refrigerated.

2. Description of the Related Art

There are two methods of transporting commodities. In one method, commodities refrigerated in a warehouse at a starting place are loaded onto a truck (hereinafter referred to as a refrigerator car) having one freezer or one refrigerator, and then transported to a destination, where the commodities are unloaded from the refrigerator car in order to store them in a warehouse at the destination. In the other method, commodities are stored in a heat insulating container at a station (starting place) where a cooling device is provided, and the container can be loaded on and unload from the refrigerator car. A first cooling device for refrigerating the inside of the container at the station, and a second cooling device for refrigerating the inside of the container on the refrigerator car are also provided (Refer to Japanese Patent Unexamined Publication No. 63-169464).

As regards the above first method, because all the refrigerated commodities stored in the refrigerator car are controlled in a uniform temperature zone, a plurality of refrigerator cars are required when the commodities are transported while being kept refrigerated in different temperature zones. This results in a problem in that one refrigerator car only is not capable of transporting the commodities while being kept refrigerated in different temperature zones.

As regards the above second method, although the heat insulating container may be loaded on and unloaded from the refrigerator car, it is necessary for the station to have the first cooling device which refrigerates the inside of the container. The container must be linked to the first cooling device in order to refrigerate the inside of the container. This leads to a problem in that the preparation for such linkage between the container and the first container takes much time.

The present invention provides a refrigerated commodities transport system which transports commodities refrigerated in different temperature zones in only one refrigerator car and which facilitates cooling work at a station.

SUMMARY OF THE INVENTION

The present invention provides a refrigerated commodities transport system, comprising: freight-collecting means for collecting from a client commodities to be refrigerated or already refrigerated commodities; storing means for storing the collected commodities in a low temperature area so as to keep them refrigerated; said storing means including a refrigerating box: transport means for transporting the commodities while being stored in said low temperature area; delivering means for delivering the commodities which are kept refrigerated to a recipient; in which said refrigerating box comprises: a cooling device which has a freezing room, a cold-heat accumulating agent stored in said freezing room, air blowers and an evaporator which forms a freezing cycle together with a compressor, so as to freeze said cold-heat accumulating agent; a storing room in which the commodities are stored; an air-blowing device for circulating air which has been cooled by the dissolution latent heat of the cold-heat accumulating agent to the storing room; a selecting section which can select, by switching, any one of the two or more different temperature zones as a temperature in the storing room, and which outputs a selection signal; and a temperature control device which receives the selection signal which has been output, and the temperature control device controls the operation of the air-blowing device for circulation so as to obtain the blown air quantity suitable for maintaining the storing room in the selected temperature zone.

That is, the invention provides a refrigerated commodities transport system which permits transportation, in only one refrigerating box, of refrigerated commodities or commodities to be refrigerated in different temperature zones. This is accomplished by selecting the temperature in the storing room.

Furthermore, the present invention facilitates cooling work at a starting place (station) by the fact that the air-blowing device for circulation, which is different from the one used for freezing the cold-heat accumulating agents, cools the storing room.

The above and other objects, features and advantages of the invention will become clear from the following description of the preferred embodiment thereof when read in conjunction with the accompanying drawings.

BRIEF DESCRIPTION OF THE DRAWINGS

All of the drawings illustrate an embodiment of the present invention.

DESCRIPTION OF THE PREFERRED EMBODIMENT

An embodiment of the present invention will now be described with reference to FIGS. 1 through 7.

Figure 1:
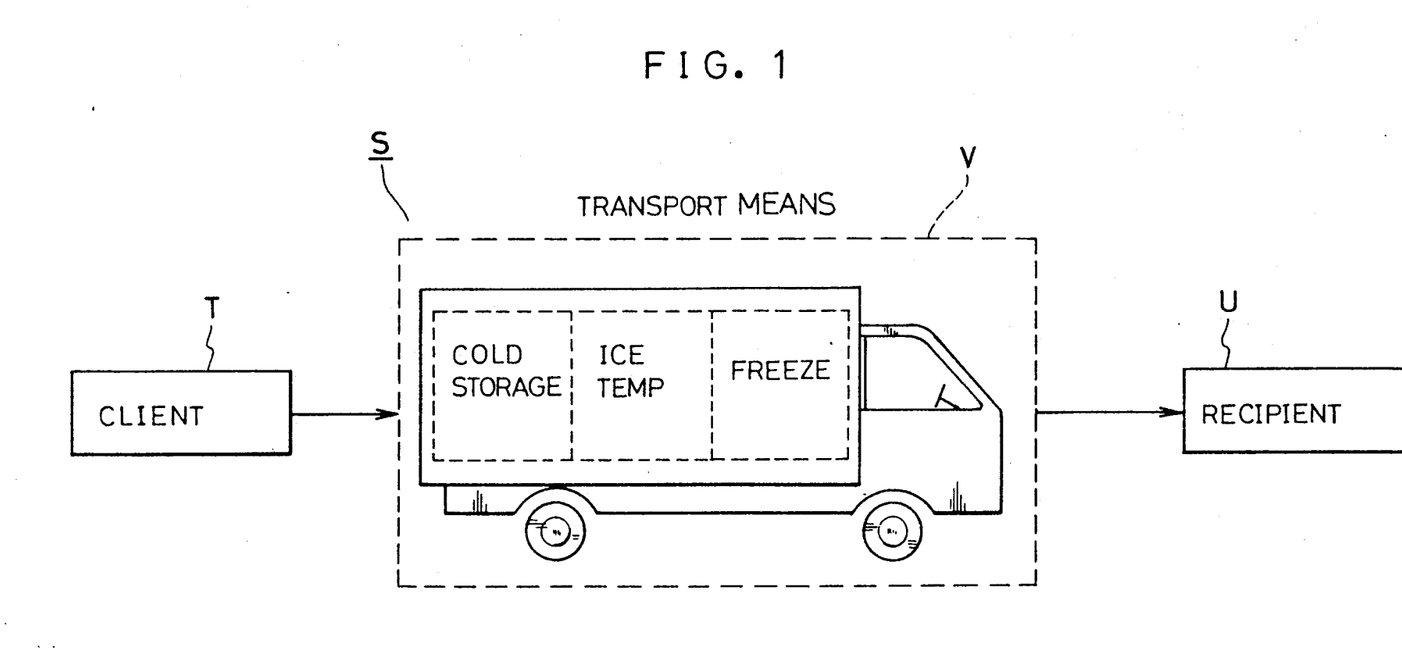
FIGS. 1 and 2 are views respectively illustrating the basic and specific patterns of a refrigerated commodities transport system.
Figure 2:
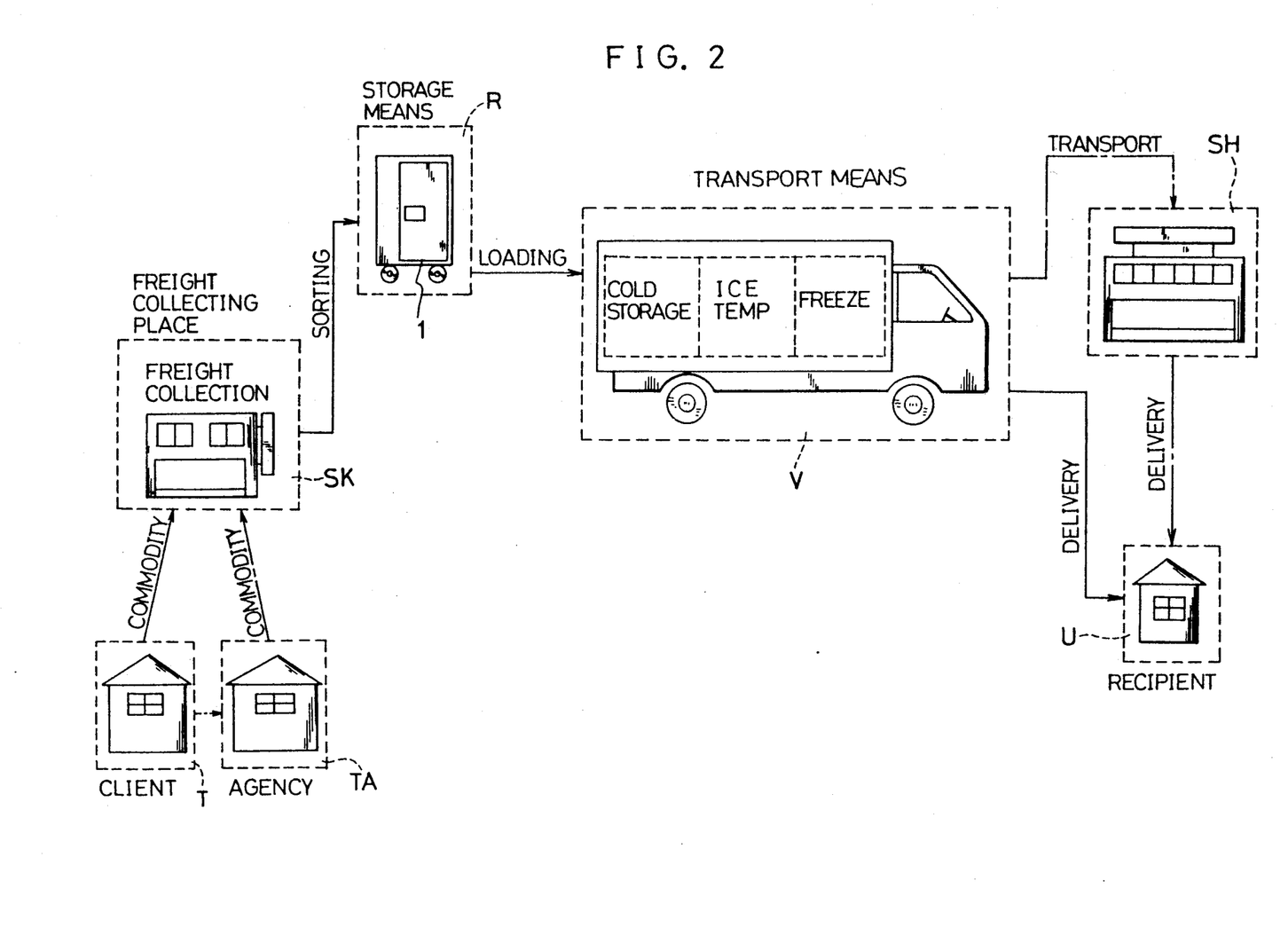

FIGS. 1 and 2 are schematic diagrams illustrating the distribution flow of a refrigerated commodities transport system (hereinafter referred to as a system) in which commodities are transported from a client to a recipient while being kept refrigerated.

This transport system S includes a side, or client T, from which a commodity is sent to a recipient U and a transport means V for transporting the commodity from the client T to the recipient U after receiving a request from the client T. FIG. 1 shows a basic pattern of the system S, while FIG. 2 shows a specific pattern of the system S, which is adapted to meet the demands of reality. In FIG. 2, commodities to be refrigerated or commodities already refrigerated are collected at a freight-collecting place SK, which is a freight-collecting means, directly from the client T or through an agency TA. The commodities thus collected are sorted according to destination and storing temperature, and are stored in the low temperature area of a refrigerating box 1, the refrigerating box 1 being a storing means R. The refrigerating box 1 is then loaded onto the transport means V and delivered to the recipient U. (In this case, the transport means also serves as a delivering means.) In some transport means V, the commodities are first delivered to a freight-collecting place SH close to a destination and then they are loaded onto a delivering means to be delivered from there to the recipient U. In the freight-collecting place SK, the refrigerating box 1 cools the storing room thereof while freezing cold-heat accumulating agents which ar stored in a cooling device connected to a power supply. The frozen cold-heat accumulating agents are stored in the refrigerating box 1 in order to serve as a cooling source in transit.

An embodiment of the refrigerating box will be described hereinafter with reference to the drawings.

Numeral 1 denotes a refrigerator which is a refrigerating box. In this embodiment, a refrigerator referred to as a cold roll box will be explained. The cold roll box is utilized when commodities are transported by the transport means V, such as a truck, while being kept refrigerated.

First, in FIGS. 3 through 7, the refrigerator 1 has casters 2 for moving at its bottom, a heat insulating box 4 with an opening 3 on one side, and a heat insulating door 5 which freely opens and closes the opening 3. A freezing room 7 partitioned by a partition board 6 and a specification selecting room 8, designed as a storing room, which is a low temperature area, are arranged inside the refrigerator 1.

Figure 4:
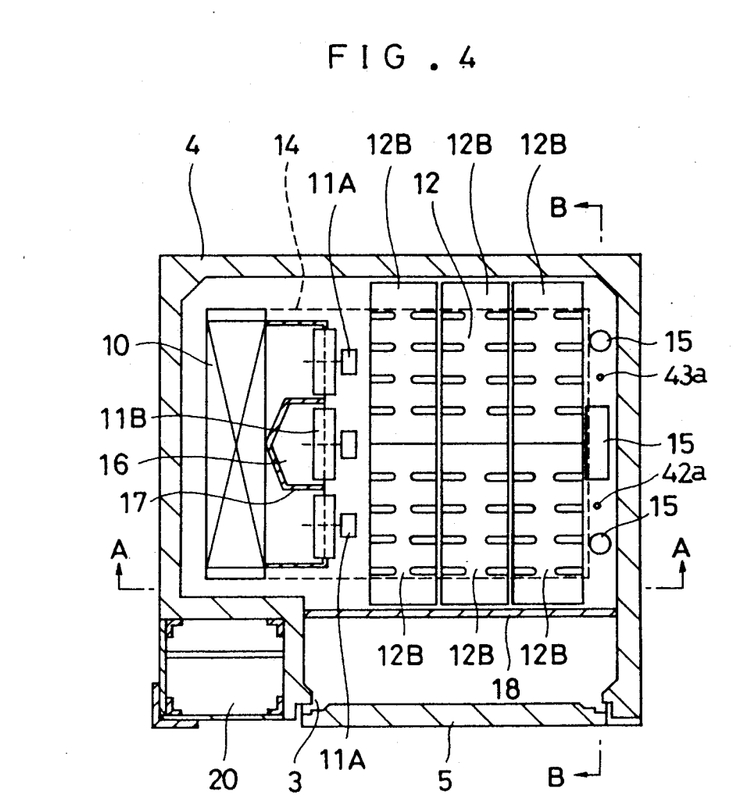
FIG. 4 is a transverse sectional view of a freezing room.
Figures 5, 6:
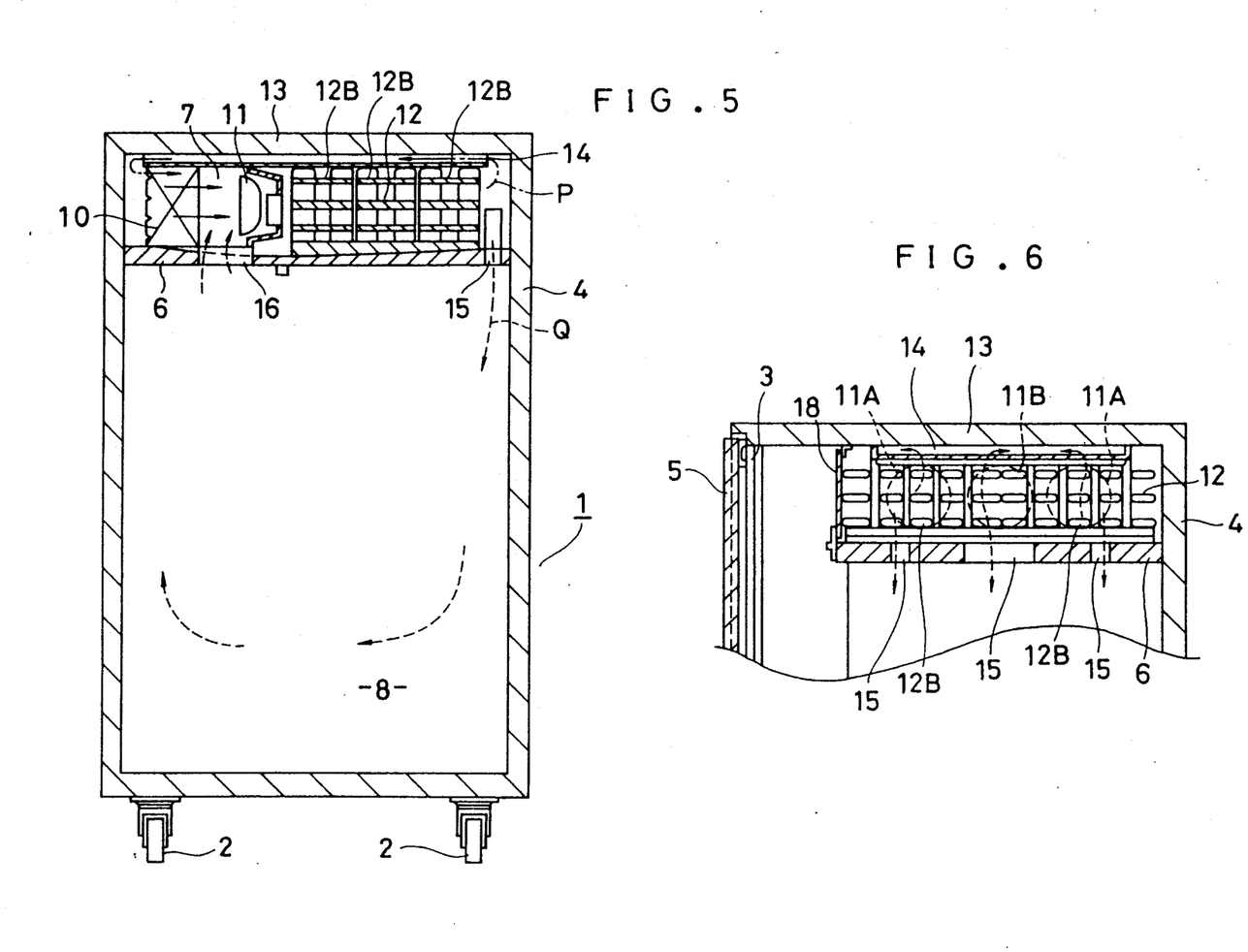
FIG. 5 is a cross-sectional view taken along line A—A of FIG. 4.
FIG. 6 is a cross-sectional view taken along line B—B of FIG. 4.

An evaporator 10 or cooling device, a plurality of air-blowing devices 11, and a cold-heat accumulating agent storing section 12 for housing cold-heat accumulating agents 12B are, disposed in the freezing room 7 The cooling device forms a freezing cycle, together with a compressor and a condenser, both of which will be described later. In this embodiment, three air-blowing devices 11 are provided. Two air-blowing devices 11A are for the evaporator 10, and one air-blowing device 11B is for circulating the air inside the refrigerator 1. The former are driven by an AC power supply 30 (see FIG. 7), whereas the latter is driven by either a AC-DC converter 35 or a storage battery 50 (see FIG. 7). The air quantities of all the air-blowing devices 11A, 11B are set to substantially the same level. A duct 14 is arranged along one wall, or the top wall 13 of the freezing room 7. One end of the duct 14 is open on the downstream side of the cold-heat accumulating agent storing section 12, where the air flows to the specification selecting room 8. The other end of the duct 14 is open on the upstream side of the evaporator 10, where the air flows in. The duct 14 thus forms a cool air path P in parallel to a cool air circulating path Q, which will be described later.

Numeral 15 designates an outlet which is disposed in a portion of the partition board 6, as well as on the lower side of the cold-heat accumulating agent storing section 12, at the point where the air flows to the specification selecting room 8. Numeral 16 designates an inlet which is disposed in a portion of the partition board 6 so as to correspond to the air-blowing device 11B (for circulating the air inside the refrigerator). The outlet 15 and the inlet 16 form the cool air circulating path Q. The path Q leads the cool air, which has passed through the cold-heat accumulating agents 12B in the cold-heat accumulating agent storing section 12, from the outlet 15 to the specification selecting room 8. The cool air circulating path Q then returns the air from the inlet 16 to the cold-heat accumulating agent storing section 12.

A dividing board 17 is disposed on the side of the evaporator 10 of the air-blowing device 11B (for circulating the air inside the refrigerator). The purpose of the dividing board 17 is to prevent the drawing of the air which has passed through the evaporator 10, and to prevent the air, which has been drawn from the specification selecting room 8 through the inlet 16, from moving toward the side of the evaporator 10. Furthermore, because the air quantities of all the air-blowing devices 11A, 11B are substantially the same, the ratio of the air quantity which the air-blowing device 11B (for circulating the air inside the refrigerator) draws through the inlet 16, to the air quantity which is led to the side of the air inlet of evaporator 10 becomes substantially 1:2. The latter, or the air quantity which passes through the cool air path P can thus be increased.

Figure 3:
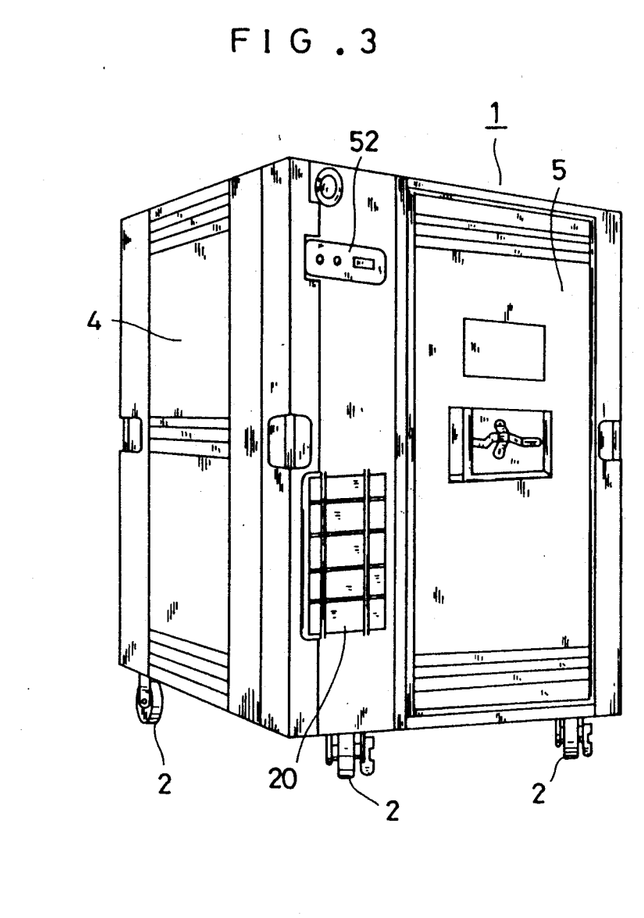
FIG. 3 is a perspective view of a refrigerating box.

Numeral 18 indicates an intermediate door made of a transparent material, formed in front of the cold-heat accumulating agent storing section 12, which freely opens and closes the commodity entrance.

Numeral 20 indicates a machine room which houses a compressor, a condenser, an air-blowing device for the condenser, and the like.

Figure 7:
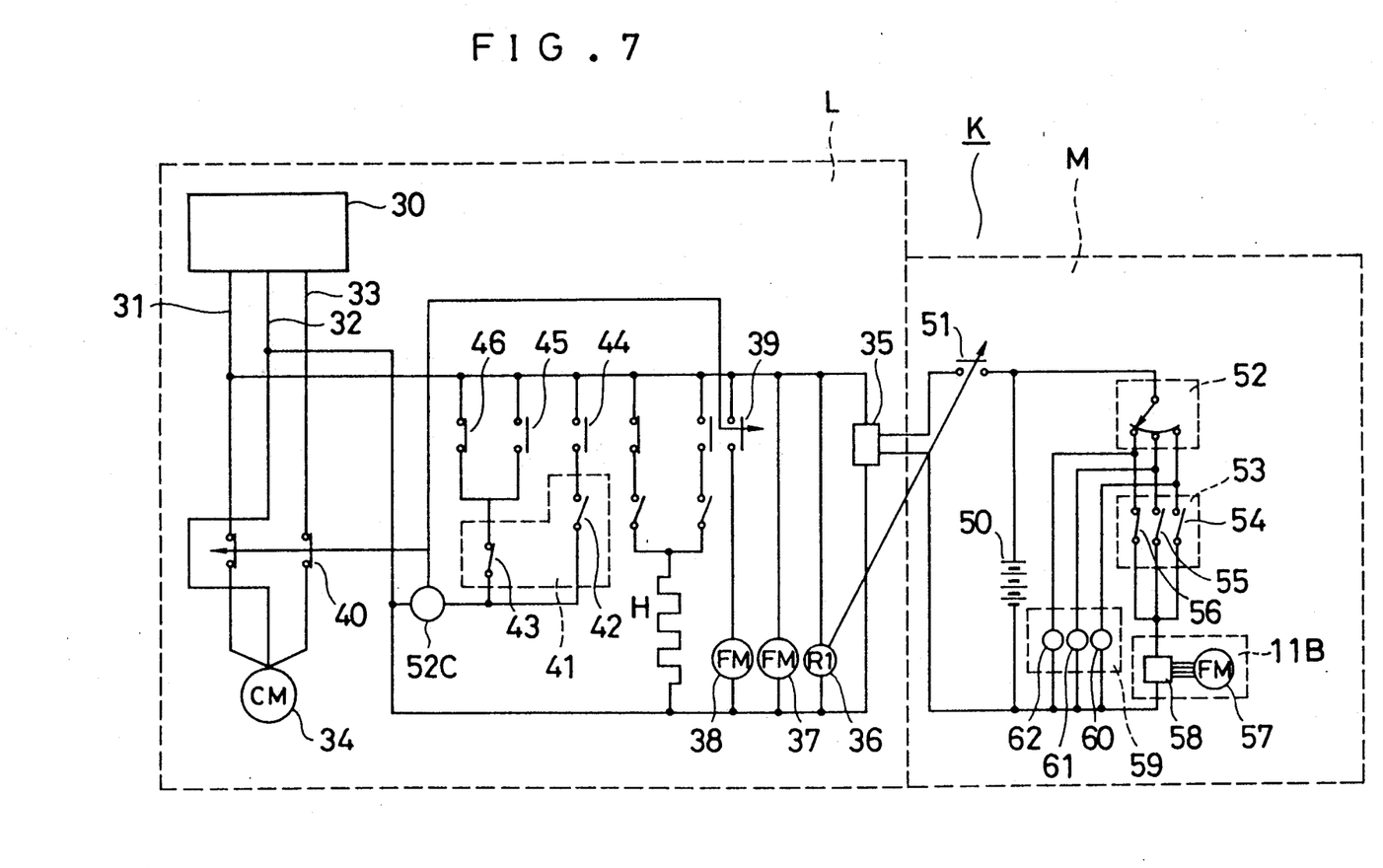
FIG. 7 is a circuit diagram of the operation control device of the refrigerating box.

A operation control device K of the refrigerator 1 will be described hereinafter with reference to FIG. 7.

Reference character L denotes an AC circuit section, while M denotes a DC circuit section. Numeral 30 denotes a three-phase AC power supply, and 34 denotes a compressor driving motor, which is connected to power supply lines 31 through 33.

Numeral 35 denotes an AC-DC converter, which converts an alternating current to a direct current, and which also acts as a battery charger in order to obtain voltage sufficient for charging a storage battery 50, which will be described later. Numeral 36 denotes a first relay coil; 37 denotes an AC fan motor for the air-blowing devices 11A for the evaporator; and 38 denotes an AC fan motor for the air-blowing device for the condenser. Numeral 39 and 40 denote respectively a first switch and a second switch for a magnet coil 52C.

Numeral 41 designates a freezing room temperature control section, which is a first control section. This freezing room temperature control section detects the temperature inside the cold-heat accumulating agent storing section 12, and controls, based on the detected temperature, the operation and stopping of the compressor driving motor 34. The freezing room temperature control section 41 maintains by the above control the cold-heat accumulating agent storing section 12 in the freezing room 7 at a freezing temperature (e.g., $-10°$ C. or less), which is a first temperature. (One of the cold-heat accumulating agents to be stored in the cold-heat accumulating agent storing section 12 has a freezing temperature of $-25°$ C., while the other has a freezing temperature of $-5°$ C. The former is referred to as a cold-heat accumulating agent for freezing and the latter as a cold-heat accumulating agent for ice temperature cold storage.) In this embodiment, one of the above two types of cold-heat accumulating agents different freezing temperatures is stored in the cold-heat accumulating agent storing section 12. The temperature inside the cold-heat accumulating agent storing section 12 can be controlled at plurality of temperatures according to the freezing temperature of one of the selected cold-heat accumulating agents.

Numeral 42 indicates a first thermostat. The first thermostat controls the inside of the cold-heat accumulating agent storing section 12 at a temperature (−35° C.) which is 10° C. lower than the freezing temperature (−25° C.) of the cold-heat accumulating agent for freezing, in order to keep this cold-heat accumulating agent frozen. (The temperature sensitive section 42a of the first thermostat is arranged on the downstream side of the cold-heat accumulating agent storing section 12.) Numeral 43 indicates a second thermostat. The second thermostat 43 controls the inside of the cold-heat accumulating agent storing section 12 at a temperature (−15° C.) which is 10° C. lower than the freezing temperature (−5° C.) of the cold-heat accumulating agent for ice temperature cold storage, in order to keep this cold-heat accumulating agent frozen. (The temperature sensitive section 43a of the second thermostat is arranged on the downstream side of the cold-heat accumulating agent storing section 12.) Numeral 44 indicates the switch of a second relay coil 60 which is connected in series to the first thermostat 42. A description of the second relay coil 60 will be presented later. Numerals 45 and 46 are switches, connected to each other in parallel, which are together connected in series to the second thermostat 43. They respectively correspond to a third relay coil 61 and a fourth relay coil 62, both of which will be explained later.

Solutions of water, ethylene glycol, and adhesive paste, or solutions of natural carbohydrates, mineral salts, preservatives for food, coloring agents for food, etc. are used as a cold-heat accumulating agent.

The DC circuit section M is connected to the output side of the AC-DC converter 35. Numeral 50 designates a chargeable and dischargeable storage battery, which serves as a DC power supply, connected to the AC-DC converter 35 through the switch 51 of the first relay coil 36.

Numeral 52 designates an operation section, which is a temperature setting section. Any one of the following three temperature zones is selected by the operation section 52. One zone is a zone where commodities stored in the specification selecting room 8 are frozen, that is, a freezing temperature zone (e.g., −10° C. or less); another zone is a zone where temperatures range from 0° C. to a point just below that at which the commodities freeze, i.e., the ice temperature zone −5° C.–0° C.); and the third zone is a cold storage zone (1° C.–10° C.). The operation section 52 actuates, based on the above selection, a storing room temperature control section 53, which is a temperature control device, arranged at an appropriate place in the specification selecting room 8. The operation section 52 controls, by controlling the operation and stopping of the air-blowing device 11B (for circulating the air inside the refrigerator), the blown air quantity per unit time for this air-blowing device 11B. Numeral 57 denotes a DC fan motor, while numeral 58 denotes a controller which controls the revolutions per minute and the direction of rotation of the DC fan motor 57. In this embodiment, however, the controller 58 causes the DC fan motor 57 to rotate at a single revolutions per minute in a single direction.

The storing room temperature control section 53 provides three thermostats: a freezing thermostat 54; an ice temperature thermostat 55; and a cold storage thermostat 56. The freezing thermostat 54 maintains the temperature in the specification selecting room 8 in the freezing temperature zone, e.g., at −15° C., which corresponds to a first temperature. The ice temperature thermostat 55 maintains the temperature in the room 8 in the ice temperature zone, e.g., at 0° C., which is a second temperature and which is higher than the first temperature. The cold storage thermostat 56 maintains the temperature in the room 8 in the cold storage zone, e.g., at 5° C., which is a third temperature and which is higher than the second temperature. Any one of the above three thermostats is selected by the selecting operation of the operation section 52 in order to control the air-blowing device 11B (for circulating the air inside the refrigerator), more specifically, to control the air quantity of the air-blowing device 11B, so as to maintain the specification selecting room 8 at one of the selected temperatures.

Numeral 59 indicates a group of relays connected in parallel to the storing room temperature control section 53 for serial circuits which are connected to the air-blowing device 11B (for circulating the air inside the refrigerator). Numeral 60 indicates a second relay coil corresponding to the freezing thermostat 54; 61 indicates a third relay coil corresponding to the ice temperature thermostat 55; and 62 indicates a fourth relay coil corresponding to the cold storage thermostat 56.

Further, in this embodiment, an example is disclosed where the temperature control sections 41, 53 comprise the thermostats. However, the operation and stopping of the compressor driving motor 34 and the air-blowing device 11B (for circulating the air inside the refrigerator) may also be controlled by providing thermistors in the freezing room 7 and the specification selecting room 8 so as to correspond to a detected signal from each of the thermistors and to a temperature zone (specifically, any one from among the freezing, ice temperature, and cold storage zones) which is selected by the operation section 52.

The cooling of the freezing room 7 and the specification selecting room 8 will now be described based on the foregoing structure, provided that the insides of both the rooms are in the state where they are not cooled.

When cold-heat accumulating agents for freezing are stored in the cold-heat accumulating agent storing section 12, before the freezing temperature is selected by the operation section 52, the freezing thermostat 54 is then selected by this selection of the freezing temperature. Then, after a cooling operation switch (not shown) is depressed, or a power supply plug is put into the socket (both the plug and socket not shown), an electric current is introduced to the first relay coil 36 in order to close the switch 51. The storage battery 50 is then charged, and the current is introduced to the air-blowing device 11B (for circulating the air inside the refrigerator) as well as to the second relay coil 60. At the same time, the current is introduced not only to the magnet coil 52C and the compressor driving motor 34, but also to the AC fan motors 37, 38. All the above components then start to operate.

Accordingly, the inside of the cold-heat accumulating agent storing section 12 is gradually cooled by the air, which has become cooled after passing through the evaporator 10, and the cold-heat accumulating agents 12B freeze. Furthermore, the inside of the specification selecting room 8 is gradually cooled by the dissolution latent heat of the cold-heat accumulating agents 12B, once the air-blowing device 11B (for circulating the air inside the refrigerator) starts operating.

At this time, the cool air which has blown to the downstream side of the cold-heat accumulating agents 12B in the cold-heat accumulating agent storing section 12 is branched into the following two flows. One flow forms a path, or cool air circulating path Q(hereinafter referred to as a cool air flow (X)), in which the air flows from the outlet 15 into the specification selecting room 8 and returns to the cold-heat accumulating agent storing section 12 through the inlet 16. The other flow forms a path, or cool air bypass P (hereinafter referred to as a cool air flow (Y)), in which the air returns to the upstream side of the evaporator 10 via the duct 14 and then to the cold-heat accumulating agent storing section 12, after having been cooled by the evaporator 10.

Moreover, as has been described above, since the air quantity of the cool air flow (Y) is large, and since the cool air is directly introduced to the evaporator 10, without having nearly been heat-exchanged after having passed through the cold-heat accumulating agents 12B, the increase in the air temperature returning to the evaporator 10 is controlled. For these reasons, the heat-exchanging capacity of the evaporator 10 is not lowered, and yet air cooler than before can be blown to the cold-heat accumulating agents 12B. Further, the cooling efficiency of the cold-heat accumulating agents 12B increases, and the time required for freezing the cold-heat accumulating agents 12B can be shortened, as compared with the time for freezing the cold-heat accumulating agent of the conventional forced convection type.

When the temperature in the specification selecting room 8 falls as low as the open operation temperature of the thermostat 54 (which is set to $-16°$ C. in this embodiment), the contact of the thermostat 54 opens in order to stop the air-blowing device 11B (for circulating the air inside the refrigerator). The forced convection of the cool air inside the specification selecting room 8 is then stopped. This cessation of the forced convection of the cool air causes the forced freezing in the room 8 to stop, and therefore the temperature gradually rises. On the contrary, when the temperature in the room 8 rises as high as the return operation temperature of the thermostat 54 (which is set to $-14°$ C. in this embodiment), the contact of the thermostat 54 closes in order to re-start the air-blowing device 11B (for circulating the air inside the refrigerator), and further to cool the specification selecting room 8 by the forced convection. The specification selecting room 8 is kept at freezing temperature by repeating the above-mentioned operation.

When the ice temperature or the cold storage temperature is selected by the operation section 52, the operations for both of the two temperatures are the same as those described above, except that operations for "the freezing temperature" and "for freezing" are replaced with "ice temperature" and "for ice temperature", or with "cold storage temperature" and "for cold storage." The explanations of the two temperatures are therefore omitted. However, when the two temperatures are selected, due to the temperature relationship where freezing<ice temperature<cold storage, the operation temperatures of the thermostats differ from each other. The time required for stopping the air-blowing device 11B (for circulating the air inside the refrigerator), therefore, becomes shorter than that at the freezing temperature. As a result, the air quantity of the air-blowing device 11B becomes small.

Because the cool air is introduced through the duct 14 from the outlet side of the cold-heat accumulating agent storing section 12 to the air inlet side of the evaporator 10, the duct 14 serves as a bypass for the cool air and promotes the cooling in the cold-heat accumulating agent storing section 12. Cooling in the cold-heat accumulating agent storing section 12 is promoted, particularly because the cool air quantity flowing through the cool air flow (Y) is larger than the cool air quantity flowing through the cool air flow (X). Moreover, since the cool air flowing through the cool air flow (Y) return directly to the evaporator 10, without passing through the storing room 8, at a relative humidity less than that of the cool air flow (X), the amount of frosting for the evaporator 10 per unit time is decreased and thus the necessity for defrosting is made less frequent.

Furthermore, when the cold-heat accumulating agent storing section 12 gradually cools and the temperature in the storing section 12 falls to the open operation temperature of the first thermostat 42 (which is set to $-36°$ C.), the contact of the thermostat 42 opens in order to stop the compressor driving motor 34. The cessation of the motor 34 prevents the cooling in the freezing room 7 from over-cooling. The air-blowing device 11A for the evaporator, however, keeps operating because it is electrically connected to the AC fan motor 37. After the cooling of the freezing room 7, when the temperature inside the cold-heat accumulating agent storing section 12 gradually rises to the return temperature of the first thermostat 42 (which is set to $-34°$ C. in this embodiment), the contact of the thermostat 42 closes in order to again drive the compressor for cooling the freezing room 7. By repeating the above-mentioned operation, the inside of the cold-heat accumulating agent storing section 12 is kept at a temperature ($-35°$ C. in this embodiment) lower than the freezing temperature of the cold-heat accumulating agents for freezing.

When the cold-heat accumulating agents for ice temperature cold storage, instead of the cold-heat accumulating agents for freezing, are housed in the cold-heat accumulating agent storing section 12, and when the ice temperature or the cold storage temperature is selected by the operation section 52, the operation of the second thermostat 43 in the freezing room is the same as that of the first thermostat 42, except that the operation of the first thermostat 42 is replaced with that of the second thermostat 43. The explanation of the operation of the second thermostat 43 is therefore omitted.

Throughout the foregoing embodiment, the storing room 8, which is a specification selecting room, is kept in one of the three temperature zones: the freezing zone, the ice temperature zone, and the cold storage zone. The storing room 8, however, may also be kept by selecting one of the following three two-temperature zones: combination of freezing and ice temperature, combination of ice temperature and cold storage, and combination of freezing and cold storage. In this case, a refrigerating box corresponding to two temperature zones, rather than to three-temperature zones disclosed in this embodiment, is provided. The circuit structure of the temperature control device and others can be substantially eliminated.

According to the construction as has been described above, the cooling device installed in the refrigerating box freezes the cold-heat accumulating agents. At the same time, the dissolution latent heat of the cold-heat accumulating agents cools the storing room. Furthermore, the blown air quantity of the air-blowing device for circulation is controlled so as to correspond to the temperature zones which are selected by a selecting section. For these reasons, only one refrigerating box can be utilized by selecting a plurality of temperature zones. The plurality of temperature zones here are intended, as has been described above, to comprise a temperature zone where commodities are frozen and a temperature zone where the commodities are not frozen. The latter temperature zone is divided into an ice temperature zone and a cold storage temperature zone. Further, because merely the simple connection of a power supply to the refrigerating box allows the cooling device to operate, the installation of the cooling device to storing means can be eliminated, except for the storing means of the refrigerated commodities transport system of the present invention. Furthermore, since the inside of the refrigerating box is cooled by the forced convection system of the air-blowing device for circulation, the temperature distribution in the refrigerating box becomes even. This makes it possible to keep the inside of the storing room sufficiently in the ice temperature zone.

As has been described in detail, according to the refrigerated commodities transport system of the present invention, the commodities are stored at low temperatures by the cooling device installed in the storing means. No cooling devices which are installed in other means included in the above system are required. Further, commodities with different storing temperatures can be transported at the same time by the fact that a plurality of refrigerating boxes with different selecting temperatures can be loaded onto the transport system. This is because as the above storing means, the invention utilizes refrigerating boxes, in which one of the following two temperature zones; the temperature zone where the commodities are frozen, or the temperature zone where they are not frozen, can be selected. In addition, because all the refrigerating boxes control, while in transit, the air-blowing device for circulation, the electric power required for the refrigerating boxes may be reduced, as compared with that of the refrigerating box where the cooling device is driven. The temperature in the refrigerating box can be easily and evenly distributed, as compared with the refrigerating box of the natural convection type.

As has been explained, the cold-heat accumulating agents 12B stored in the cold-heat accumulating agent storing section 12, as well as the commodities stored in the specification selecting room 8, are first cooled at predetermined temperatures at a station (starting place), before the commodities are transported. The refrigerator 1 is then loaded onto a refrigerator car. Only the storage battery 50 of the DC circuit section M operates the DC fan motor 57. The commodities in the specification selecting room 8 are transported by the refrigerator car to a destination, while being kept in a temperature zone which has been selected.

The cold-heat accumulating agents 12B can be placed in and out of the cold-heat accumulating agent storing section 12. Therefore, at the station, commodities to be frozen, instead of the cold-heat accumulating agents 12B, may also be stored in the cold-heat accumulating agent storing section 12.

The above has been offered for illustrative purposes only, and is not intended to limit the scope of the invention of this application, which is as defined in the claims below.

What is claimed is:

1. A refrigerated commodities transport system, comprising:
   freight-collecting means for collecting from a client commodities to be refrigerated or already refrigerated commodities;
   storing means for storing the collected commodities in a low temperature area so as to keep them refrigerated; said storing means including a refrigerating box;
   transport means for transporting the commodities while being stored in said low temperature area;
   delivering means for delivering the commodities which are kept refrigerated to a recipient; in which said refrigerating box comprises
   a cooling device which has a freezing room, a cold-heat accumulating agent stored in said freezing room, air blowers and an evaporator which forms a freezing cycle together with a compressor, so as to freeze said cold-heat accumulating agent;
   a storing room in which the commodities are stored;
   an air-blowing device for circulating air which has been cooled by the dissolution latent heat of said cold-heat accumulating agent to said storing room;
   a selecting section which can select, by switching, any one of the two or more different temperature zones as a temperature in said storing room, and which outputs a selection signal; and
   a temperature control device which receives the selection signal which has been output, and said temperature control device controls the operation of said air-blowing device for circulation so as to obtain the blown air quantity suitable for maintaining said storing room in the selected temperature zone.

2. The system according to claim 1, wherein the two or more different temperature zones include a temperature zone where the commodities are frozen and a temperature zone where the commodities are not frozen.

3. The system according to claim 1, wherein the temperature zone where the commodities are frozen includes a freezing temperature zone, and the temperature zone where the commodities are not frozen includes an ice temperature zone and a cold storage temperature zone.

4. The system according to claim 1, wherein a truck is utilized as the transport means.

5. The system according to claim 1, wherein the compressor and the air blowers of said cooling device are driven by an AC power supply which is installed in a starting place, and wherein said air-blowing device for circulation is driven by a DC power supply which is loaded onto the transport means.

6. The system according to claim 1, wherein the cold-heat accumulating agent includes solutions of water, ethylene glycol, and adhesive paste, or solutions of natural carbohydrates, mineral salts, preservatives for food, and coloring agents for food.

* * * * *